Patented May 21, 1946

2,400,808

UNITED STATES PATENT OFFICE 2,400,808

PREPARATION OF AQUEOUS DISPERSIONS OF VINYL CHLORIDE POLYMERS

Edward R. Burns, Cheshire, Conn., assignor, by mesne assignments, to Dispersions Process, Inc., New York, N. Y., a corporation of Delaware No Drawing. Application September 21, 1943, Serial No. 503,266

10 Claims. (Cl. 260—32)

This invention relates to the preparation of aqueous dispersions of vinyl chloride polymers, for example, polymerized vinyl chloride, and vinyl chloride-vinyl acetate copolymers, and more particularly to the preparation of aqueous dispersions of vinyl chloride polymers which are free from OH groups.

Vinyl chloride polymers which are free from OH groups are not capable of being dispersed in an aqueous medium by the conventional procedure of mixing into the polymer a plasticizing agent and a hydrophilic colloidal dispersing agent, and adding water to the plasticized mass, as in an internal mixer, until an inversion of phase takes place. On addition of water to such a plasticized mass to the point where inversion of phase should ordinarily take place, the batch breaks up into small pieces with the dispersing agent, such as soap, running out of the broken batch.

According to the present invention, I have been able to prepare an aqueous dispersion of vinyl chloride polymer, such as polyvinyl chloride, and vinyl chloride-vinyl acetate copolymer, which are free from OH groups.

In carrying out the invention, there is mixed with the vinyl chloride polymer which is free from OH groups, another vinyl chloride polymer which contains OH groups, together with the usual plasticizer and hydrophilic colloidal dispersing agent, after which on addition of water to the plasticized mass with the usual kneading and stretching of the mass as in an internal mixer, such as a Werner & Pfleiderer mixer, an inversion of phase takes place and the polymers disperse in the aqueous medium. The plasticizer may be any of the conventional plasticizers for vinyl polymers and the hydrophilic colloidal dispersing agent may be a conventional dispersing agent, such as a protein, for example solubilized casein, or soap. The vinyl chloride polymer which contains OH groups may be either a polyvinyl chloride or a vinyl chloride-vinyl acetate copolymer and either of such vinyl chloride polymers may be added to the vinyl chloride polymer which it is desired to disperse in the aqueous medium. The amount to be added of the vinyl chloride polymer which contains OH groups, and the degree of hydrolysis of such vinyl chloride polymer may be varied as desired. 10 to 25 parts of a vinyl chloride polymer containing as little as 3% of the ester groups hydrolyzed to OH groups, will readily permit the dispersion in water of a vinyl chloride polymer which is free from OH groups. The following examples are illustrative of the invention:

Example I 90 parts (all parts herein are by weight) of a commercial powdered vinyl chloride-vinyl acetate copolymer which is free from OH groups ("Vinylite VYNW"), were introduced into a Werner and Pfleiderer mixer and to the same was added with constant mixing 10 parts of a commercial vinyl chloride-vinyl acetate copolymer which contained about 3% of OH groups based on the total ester groups ("Vinylite VMCH"). 50 parts of a commercial plasticizer dibutoxy-ethyl phthalate and 3 parts of zinc stearate were mixed with the vinyl chloride polymers followed by 20 parts of casein and 1.4 parts of sodium fluoride in a form of a 50% aqueous suspension. 10 parts of water were then mixed in, followed by 1.5 parts of triethanolamine and 15 parts of 26° Bé. ammonia. Water was slowly added to the thus plasticized mass in the internal mixer with kneading and stretching of the mass, until an inversion of phase took place and the polymer particles became dispersed in the aqueous medium. Further water was added to a 45% solids dispersion. Without the addition of the 10 parts of "Vinylite VMCH," the batch broke up into small pieces without dispersing the polymer particles.

Example II

In this case 75 parts of a commercial powdered vinyl chloride-vinyl acetate copolymer which is free from OH groups ("Vinylite VYNS") were introduced into a Werner and Pfleiderer mixer and there was added 25 parts of "Vinylite VMCH." To the mixture of vinyl chloride-vinyl acetate copolymers were added 50 parts of a plasticizer, dibutyl sebacate, 2 parts of zinc stearate, and 10 parts of oleic acid. There was then added to the plasticized mass in the mixer 10 parts of water, and a 50% aqueous suspension containing 5 parts of casein, .35 part of sodium fluoride, and 1.5 parts of triethanolamine. 17 parts of 26° Bé. ammonia were then mixed in, followed by the slow addition of water with continued kneading and stretching of the mass until inversion of phase took place and the polymer particles become dispersed in the aqueous medium, after which further water was added to a 50% solids concentration. The "Vinylite VYNS" could not be dispersed without the addition of the "Vinylite VMCH" containing the OH groups.

Example III

In this case a commercial polyvinyl chloride which was free from OH groups ("Koroseal") could not be dispersed on casein following the procedure in Example I. The addition of 20 parts of "Vinylite VMCH" to 80 parts of the Koroseal, permitted the Koroseal to be readily dispersed on casein, following the procedure shown in Example I.

In view of the many changes and modifications that may be made without departing from the principles underlying the invention, reference should be made to the appended claims for an understanding of the scope of the protection afforded the invention.

Having thus described my invention, what I claim and desire to protect by Letters Patent is:

1. The process of preparing an aqueous dispersion of a vinyl chloride polymer which is free from OH groups comprising mixing with said polymer a vinyl chloride polymer which contains OH groups, a plasticizer and a hydrophilic colloidal dispersing agent, and adding water to the plasticized mass until an inversion of phase takes place and the polymer particles become dispersed in the aqueous medium.

2. The process of preparing an aqueous dispersion of a vinyl chloride polymer which is free from OH groups comprising mixing with said polymer, a vinyl chloride polymer which contains OH groups, a plasticizer and a hydrophilic colloidal dispersing agent, and adding water to the plasticized mass in an internal mixer with kneading and stretching of the mass until an inversion of phase takes place and the polymer particles become dispersed in the aqueous medium.

3. The process of preparing an aqueous dispersion of a vinyl chloride-vinyl acetate copolymer which is free from OH groups comprising mixing with said copolymer a vinyl chloride polymer which contains OH groups, a plasticizer and a hydrophilic colloidal dispersing agent, and adding water to the plasticized mass until an inversion of phase takes place and the polymer particles become dispersed in the aqueous medium.

4. The process of preparing an aqueous dispersion of a vinyl chloride-vinyl acetate copolymer which is free from OH groups comprising mixing with said copolymer a vinyl chloride-vinyl acetate copolymer which contains OH groups, a plasticizer and a hydrophilic colloidal dispersing agent, and adding water to the plasticized mass in an internal mixer with kneading and stretching of the mass until an inversion of phase takes place and the polymer particles become dispersed in the aqueous medium.

5. The process of preparing an aqueous dispersion of a vinyl chloride polymer which is free from OH groups, comprising adding water to a plasticized mass containing said vinyl chloride polymer, a vinyl chloride polymer which contains OH groups and a hydrophilic colloidal dispersing agent, until an inversion of phase takes place and the copolymers become dispersed in the aqueous medium.

6. The process of preparing an aqueous dispersion of polyvinyl chloride, which is free from OH groups, comprising adding water in an internal mixer to a plasticized mass containing said polyvinyl chloride, a vinyl chloride polymer which contains OH groups and a hydrophilic colloidal dispersing agent, until an inversion of phase takes place and the polymer particles become dispersed in the aqueous medium.

7. The process of preparing an aqueous dispersion of a vinyl chloride-vinyl acetate copolymer which is free from OH groups, comprising adding water to a plasticized mass containing said copolymer, a vinyl chloride polymer which contains OH groups and a hydrophilic colloidal dispersing agent, until an inversion of phase takes place and the polymer particles become dispersed in the aqueous medium.

8. The process of preparing an aqueous dispersion of a vinyl chloride-vinyl acetate copolymer which is free from OH groups, comprising adding water in an internal mixer to a plasticized mass containing said copolymer, a vinyl chloride-vinyl acetate copolymer which contains OH groups and a hydrophilic colloidal dispersing agent, until an inversion of phase takes place and the copolymers become dispersed in the aqueous medium.

9. The product of the process of claim 5.

10. The product of the process of claim 7.

EDWARD R. BURNS.